United States Patent
Lu et al.

(10) Patent No.: US 10,048,408 B2
(45) Date of Patent: *Aug. 14, 2018

(54) ANTI-FOG COATING COMPRISING AQUEOUS POLYMERIC DISPERSION, CROSSLINKER AND ACID OR SALT OF POLYALKYLENE OXIDE

(71) Applicant: 3M INNOVATIVE PROPERTIES COMPANY, St. Paul, MN (US)

(72) Inventors: Yongshang Lu, Woodbury, MN (US); Naiyong Jing, Woodbury, MN (US); Dang Xie, Shanghai (CN); Zhigang Yu, Shanghai (CN); Caroline M. Ylitalo, Stillwater, MN (US); Mahfuza B. Ali, Mendota Heights, MN (US); Alexander J. Kugel, Woodbury, MN (US); Steven P. Swanson, Blaine, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 6 days.

This patent is subject to a terminal disclaimer.

(21) Appl. No.: 14/361,076

(22) PCT Filed: Nov. 1, 2012

(86) PCT No.: PCT/US2012/062903
§ 371 (c)(1),
(2) Date: May 28, 2014

(87) PCT Pub. No.: WO2013/089927
PCT Pub. Date: Jun. 20, 2013

(65) Prior Publication Data
US 2015/0118501 A1 Apr. 30, 2015

Related U.S. Application Data

(60) Provisional application No. 61/576,044, filed on Dec. 15, 2011.

(51) Int. Cl.
| | | |
|---|---|---|
| C09K 3/18 | (2006.01) |
| C09D 133/00 | (2006.01) |
| C09D 175/04 | (2006.01) |
| C08K 5/06 | (2006.01) |
| G02B 1/18 | (2015.01) |
| C09D 5/02 | (2006.01) |
| C09D 5/16 | (2006.01) |
| C08K 5/00 | (2006.01) |
| G02B 27/00 | (2006.01) |
| C03C 17/00 | (2006.01) |
| C03C 17/32 | (2006.01) |

(52) U.S. Cl.
CPC ............. *G02B 1/18* (2015.01); *C03C 17/007* (2013.01); *C03C 17/322* (2013.01); *C08K 5/0025* (2013.01); *C08K 5/06* (2013.01); *C09D 5/024* (2013.01); *C09D 5/1687* (2013.01); *C09D 133/00* (2013.01); *C09D 175/04* (2013.01); *C09K 3/18* (2013.01); *G02B 27/0006* (2013.01); *C03C 2217/445* (2013.01); *C03C 2217/478* (2013.01); *Y10T 428/3158* (2015.04); *Y10T 428/3192* (2015.04); *Y10T 428/31551* (2015.04); *Y10T 428/31605* (2015.04); *Y10T 428/31699* (2015.04); *Y10T 428/31935* (2015.04)

(58) Field of Classification Search
CPC ............... C03C 17/007; C03C 17/322; C03C 2217/445; C03C 2217/478; C08K 5/0025; C08K 5/06; C09D 133/00; C09D 175/04; C09D 5/04; C09D 5/1687; C09K 3/08; Y10T 428/31551; Y10T 428/3158; Y10T 428/31605; Y10T 428/31699; Y10T 428/3192; Y10T 428/31935
USPC ............. 428/423.1, 480, 482, 500; 523/169; 427/385.5
See application file for complete search history.

(56) References Cited

U.S. PATENT DOCUMENTS

| | | |
|---|---|---|
| 2,803,552 A | 8/1957 | Stedman |
| 3,022,178 A | 2/1962 | Park |
| 3,425,976 A | 2/1969 | Adams |
| 3,437,617 A | 4/1969 | Bogle |
| 3,484,157 A | 12/1969 | Crandon |
| 3,488,215 A | 1/1970 | Shepherd |
| 3,700,487 A | 10/1972 | Crandon |

(Continued)

FOREIGN PATENT DOCUMENTS

| | | |
|---|---|---|
| CN | 1747906 | 3/2006 |
| CN | 101065456 | 10/2007 |

(Continued)

OTHER PUBLICATIONS

Trotoir, "Anti-fog/antistat eases processing problems", Modern Plastics, Oct. 1988, 3 pgs.
Howarter, "Self-Cleaning and Next Generation Anti-Fog Surfaces and Coatings", Macromolecular Rapid Communications, 2008, vol. 29, pp. 455-466.
Nie, "Superhydrophilic Anti-Fog Polyester Film by Oxygen Plasma Treatment", Proceedings of the Nano/Micro Engineered and Molecular Systems, 4th IEEE International Conference, Jan. 2009, pp. 1017-1020.
Chattopadhyay, "Structural engineering of polyurethane coatings for high performance applications", Progress in Polymer Science, 2007, vol. 32, pp. 352-418.

(Continued)

*Primary Examiner* — Thao T Tran
(74) *Attorney, Agent, or Firm* — Adrian L. Pishko; Carolyn A. Fischer

(57) ABSTRACT

Coating compositions are described comprising an aqueous polymeric dispersion; a crosslinker; and an acid or salt of a polyalkylene oxide. Also described are articles comprising the dried and cured coating composition disposed on a substrate as well as a method a providing an anti-fog coating on a substrate.

22 Claims, No Drawings

(56) References Cited

U.S. PATENT DOCUMENTS

| | | | |
|---|---|---|---|
| 3,725,352 A * | 4/1973 | Koleske | C08G 63/672 525/88 |
| 3,773,776 A | 11/1973 | Iler | |
| 3,821,136 A | 6/1974 | Hudgin | |
| 3,822,238 A | 7/1974 | Blair | |
| 3,865,619 A | 2/1975 | Pennewiss | |
| 3,895,155 A | 7/1975 | Shukuri | |
| 3,897,356 A | 7/1975 | Pociluyko | |
| 4,016,129 A | 4/1977 | Miyosawa | |
| 4,027,073 A | 5/1977 | Clark | |
| 4,064,308 A | 12/1977 | Laurin | |
| 4,126,595 A * | 11/1978 | Martorano | C09D 133/00 428/418 |
| 4,127,682 A | 11/1978 | Laurin | |
| 4,211,823 A | 7/1980 | Suzuki | |
| 4,467,073 A | 8/1984 | Creasy | |
| 4,478,909 A | 10/1984 | Taniguchi | |
| 4,551,484 A | 11/1985 | Radisch | |
| 4,563,307 A * | 1/1986 | Briden | C08K 5/3412 526/263 |
| 4,605,698 A | 8/1986 | Briden | |
| 4,609,688 A | 9/1986 | Radisch | |
| 4,745,152 A | 5/1988 | Fock | |
| 4,876,302 A * | 10/1989 | Noll | C08G 18/0819 524/267 |
| 5,073,404 A | 12/1991 | Huang | |
| 5,075,133 A | 12/1991 | Hosono | |
| 5,116,442 A | 5/1992 | Daude | |
| 5,124,021 A | 6/1992 | Kaneyasu | |
| 5,134,021 A | 7/1992 | Hosono | |
| 5,262,475 A | 11/1993 | Creasy | |
| 5,424,355 A * | 6/1995 | Uemae et al. | 524/507 |
| 5,585,186 A | 12/1996 | Scholz | |
| 5,695,851 A * | 12/1997 | Watanabe | C09D 4/00 428/147 |
| 5,723,175 A | 3/1998 | Scholz | |
| 5,804,612 A | 9/1998 | Song | |
| 5,807,923 A * | 9/1998 | Sleegers | 524/757 |
| 5,821,294 A * | 10/1998 | Perlinski | 524/507 |
| 5,873,931 A | 2/1999 | Scholz | |
| 5,877,254 A | 3/1999 | La Casse | |
| 6,013,372 A | 1/2000 | Hayakawa | |
| 6,040,053 A | 3/2000 | Scholz | |
| 6,156,409 A | 12/2000 | Doushita | |
| 6,194,498 B1 | 2/2001 | Anderson | |
| 6,420,020 B1 | 7/2002 | Yamazaki | |
| 6,800,365 B2 | 10/2004 | Yamazaki | |
| 7,008,979 B2 | 3/2006 | Schottman | |
| 7,048,989 B2 | 5/2006 | Watkins | |
| 7,261,843 B2 | 8/2007 | Knox | |
| 7,838,110 B2 | 11/2010 | Zhu | |
| 8,017,666 B2 | 9/2011 | Bissinger | |
| 2003/0203991 A1 | 10/2003 | Schottman | |
| 2003/0205059 A1 | 11/2003 | Roche | |
| 2004/0022950 A1 * | 2/2004 | Jung et al. | 427/385.5 |
| 2004/0137155 A1 | 7/2004 | Bernheim | |
| 2006/0063868 A1 | 3/2006 | Janmaat | |
| 2006/0135649 A1 | 6/2006 | Jedlicka et al. | |
| 2006/0204528 A1 * | 9/2006 | Nolte | B82Y 30/00 424/401 |
| 2007/0155946 A1 * | 7/2007 | Berti | C08G 63/64 528/272 |
| 2007/0286959 A1 | 12/2007 | Palmer | |
| 2008/0017071 A1 * | 1/2008 | Moebus | C09D 5/028 106/287.24 |
| 2008/0108743 A1 * | 5/2008 | Tomizaki | C08F 265/00 524/523 |
| 2008/0160187 A1 | 7/2008 | Murata et al. | |
| 2010/0227969 A1 | 9/2010 | Zhu | |
| 2011/0195263 A1 * | 8/2011 | Malotky | C08J 3/05 428/480 |
| 2012/0101210 A1 * | 4/2012 | Nennemann | C08G 18/0828 524/507 |
| 2012/0305862 A1 * | 12/2012 | Kasahara | C08G 18/807 252/519.33 |
| 2014/0335360 A1 * | 11/2014 | Jing et al. | 428/412 |

FOREIGN PATENT DOCUMENTS

| | | | |
|---|---|---|---|
| CN | 101602913 | 12/2009 | |
| CN | 101591494 | 8/2011 | |
| EP | 0238991 A2 * | 9/1987 | C08G 18/0819 |
| EP | 2062861 | 5/2009 | |
| JP | 03275787 | 12/1991 | |
| JP | 07-102188 | 4/1995 | |
| JP | 10297081 | 11/1998 | |
| JP | 2000515564 | 11/2000 | |
| WO | WO 1993-23471 | 11/1993 | |
| WO | WO 1996-18691 | 6/1996 | |
| WO | WO 2008-039228 | 4/2008 | |
| WO | WO 2009-085680 | 7/2009 | |
| WO | WO 2010-114700 | 10/2010 | |
| WO | WO 2013-089926 | 6/2013 | |

OTHER PUBLICATIONS

Lu, "Durable Anti-fog Coatings form Waterborne Polyurethane Dispersions and Nanoparticles", Performance Materials and Coating Group, 3M, 13pgs.

International Search Report for PCT International Application No. PCT/US2012/062903, dated Mar. 1, 2013, 3pgs.

* cited by examiner

ANTI-FOG COATING COMPRISING AQUEOUS POLYMERIC DISPERSION, CROSSLINKER AND ACID OR SALT OF POLYALKYLENE OXIDE

CROSS REFERENCE TO RELATED APPLICATIONS

This application is a national stage filing under 35 U.S.C. 371 of PCT/US2012/062903, filed Nov. 1, 2012, which claims priority to Provisional Application No. 61/576044, filed Dec. 15, 2011, the disclosure of which is incorporated by reference in its/their entirety herein.

BACKGROUND

As described for example in U.S. Pat. No. 7,008,979; fog formation occurs under conditions of high humidity and high temperature or at interfacial boundaries where there is a large temperature and humidity difference. Coatings which reportedly reduce the tendency for surfaces to "fog up" (i.e., anti-fogging coatings) have been suggested.

In order to prevent this fogging, it is known to use various surface active agents to provide anti-fog properties to articles. For example, hydrophilic agents have been added to polyurethanes in order to impart anti-fog properties. Anti-fog coating compositions for transparent surfaces which include a three-dimensional cross-linked polyurethane having a free surface active agent disposed within open domains in its cross-linked structure have been suggested. The coating compositions are prepared by reacting isocyanates with polyfunctional polyols to obtain a polyurethane, and subsequently contacting the thus prepared polyurethane with a hydrophilic surface-active agent in order to diffuse molecules of the surface-active agent into the interior of the coating. (See for example U.S. Pat. Nos. 4,551,484 and 4,609,688 to Radisch et al.)

The surface-active agent, however, is not chemically reacted into the polyurethane, but is instead physically disposed within the polymeric structure. As such, the cured coating is susceptible to undesirable leaching and erosion of the surfactant, thereby decreasing the anti-fog properties of the coating composition.

It has also been proposed to react surface active agents into a polyurethane coating composition in order to impart anti-fog properties to the coating composition. For example, the addition of sulfonated "resins" to polyurethanes in order to prepare coatings with various properties including anti-fog characteristics have been suggested. The resins are prepared from diols or diamines reacted with di-carboxylic acid esters, followed by sulfonation of double bonds or quarternization of amines. The resins are intended to increase the hydrophilic character and water absorption of the polyurethane coatings by reacting into the polyurethane backbone in an end-to-end fashion, rather than as pendent groups. Such resins which react in an end-to-end fashion, as opposed to remaining pendant at the end of the polyurethane chain, cannot provide for a clear delineation of hydrophilic and hydrophobic groups and in this respect do not behave as surfactants, i.e., they do not provide cooperation between distinct hydrophilic and hydrophobic portions to reduce interfacial tension. (See for example U.S. Pat. No. 3,822,238 to Blair et al.)

Polyurethane compositions have also been suggested which are useful as coatings for transparent substrates with improved self-healing properties and prevention against formation of surface moisture. The polyurethane compositions are prepared from a reaction of an isocyanate with a polyol mixture including a difunctional sulfonated polyether polyol and a trifunctional polyol. Such a polyurethane composition incorporates only polyol combinations which impart hydrophilic character to the coating, and does not further incorporate into the composition a surfactant material. (See for example U.S. Pat. No. 4,754,152 to Fock et al.)

However, these compositions do not provide permanent fog resistance properties, i.e. fog resistant properties which last after repeated washings or extended soaking in water, nor are they effective for more than a few hours of use.

Additionally, it is known to incorporate non-ionic surfactants containing reactive functional groups into polyurethanes prepared with polyvinylpyrrolidone as a hydrophilic agent. For example, anti-fog coating compositions incorporating an isocyanate prepolymer which is reacted with a polyvinylpyrrolidone polymer, the reaction product thereof being subsequently reacted with a non-ionic surfactant having reactive groups for reacting with the isocyanate, for instance, hydroxyl reactive groups are known. Polyvinylpyrrolidone polymers, however, while serving to increase the hydrophilicity of the polyurethane matrix and improve anti-fog properties, generally reduce the scratch-resistance, chemical resistance, water sensitivity, and durability of the cured polyurethane surface. Thus, although these compositions, when cured, have been known to provide anti-fog properties, their solvent sensitivity, flexibility and scratch resistance properties are less than desirable. (See for example U.S. Pat. No. 4,467,073 to Creasy)

SUMMARY

Although various anti-fog coatings have been described, industry would find advantage in alternative compositions that can provide persistent long-lasting anti-fog properties.

In one embodiment, a coating composition is described comprising an aqueous polymeric dispersion; a crosslinker; and an acid or salt of a polyalkylene oxide.

Also described are articles comprising the dried and cured coating composition disposed on a substrate as well as a method a providing an anti-fog coating on a substrate.

DETAILED DESCRIPTION OF ILLUSTRATIVE EMBODIMENTS

The coating compositions described herein are suitable for imparting anti-fog characteristics. The coating composition comprises an aqueous polymeric dispersion, typically one that can be prepared as a latex, and more typically an alkaline pH stable latex. Favored polymeric dispersions include polyurethane polymer dispersions, acrylic polymer dispersions, and mixture thereof. Such polymers are typically thermoplastic.

The term "polyurethane" includes any polymeric material that comprises polyurethane segments. The term "polyurethane segment" refers to at least two urethane and/or urea groups that are connected by an organic group.

The term "acrylic" includes any polymer or copolymer of acrylic acid, methacrylic acid, ester of these acids or acrylonitrile.

Thermoplastic polyurethane compositions are generally the reaction product of a diisocyanate with short-chain diols (also referred to as chain extenders) and diisocyantes with long-chained difunctional diols (known as polyols). Polyurethanes are characterized as having urethane groups, i.e. —NH—(C=O)—O— that link the segments derived from the diisocyanate and diol. Such urethane group comprise a carbonyl group, i.e. a carbon atom double bonded to an oxygen atom, C=O.

Non-limiting examples of long-chained polyols are polyether polyols, polyester polyols, acrylic polyols and mixtures of such polyols. Typically, polyester based thermoplastic urethanes are known for providing good abrasion and chemical resistance. The final resin consists of linear polymeric chains in block-structures. Such chains contain low polarity segments, referred to as "soft segments", alternating with shorter, high polarity segments, referred to as "hard segments". Both types of segments are linked together by covalent links, forming random copolymers or block-copolymers.

Polyester polyols are prepared by the polyesterification of an organic polycarboxylic acid or anhydride thereof with organic polyols and/or an epoxide. Usually, the polycarboxylic acids and polyols are aliphatic or aromatic dibasic acids and diols. The diols that are usually employed in making the polyester include, but are not limited to, acyclic alkylene glycols, such as ethylene glycol and neopentyl glycol, and cyclic glycols such as hydrogenated Bisphenol A, cyclohexanediol and cyclohexanedimethanol. Polyols of higher functionality can also be used. Non-limiting examples include trimethylolpropane and pentaerythritol, as well as higher molecular weight polyols such as those produced by oxyalkylating low molecular weight polyols.

The acid component of the polyester consists primarily of monomeric carboxylic acids or anhydrides having 2 to 18 carbon atoms per molecule. Among the acids that can be used are phthalic acid, terephthalic acid, hexahydrophthalic acid, adipic acid, azelaic acid, sebacic acid, maleic acid, glutaric acid, chlorendic acid, decanoic acid and dodecanoic acid. Higher polycarboxylic acids, such as trimellitic acid and tricarballylic acid, can also be used. Where acids are referred to above, it is understood that anhydrides of those acids that form anhydrides can be used in place of the acid. Also, lower alkyl esters of the acids such as dimethyl glutarate and dimethyl-terephthalate can be used.

In addition to the polyester polyols, hydroxy-containing acrylic polymers or acrylic polyols can be used as the polyol component.

Examples of polyether polyols are polyalkylene ether polyols include those having the following general formula:

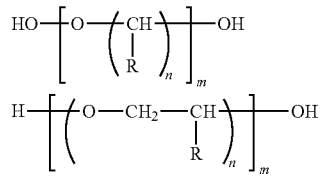

where the substituent R is hydrogen or lower alkyl containing from 1 to 5 carbon atoms including mixed substituents, and n is typically from 2 to 6 and m is from 10 to 100 or even higher. Included are poly(oxytetramethylene)glycols, poly (oxyethylene)glycols, poly(oxy-1,2-propylene)glycols and the reaction products of ethylene glycol with a mixture of 1,2-propylene oxide and ethylene oxide.

The polyisocyanates that can be used include aromatic and aliphatic polyisocyanates with aliphatic polyisocyanates being more desirable because of their superior ultraviolet light stability and non-yellowing tendencies. Non-limiting examples of such polyisocyanates include monomeric polyisocyanates, such as toluene diisocyanate, and 4,4'-methylene-bis-(cyclohexyl isocyanate), isophorone diisocyanate and NCO-prepolymers, e.g., the reaction products of monomeric polyisocyanates, such as those mentioned above, with polyester or polyether polyols. Particularly desired are the isocyanurates from isophorone isocyanate and 1,6-hexamethylene diisocyanate, both of which are commercially available.

In some embodiments, the polyurethane dispersion comprises a polyester backbone, a polycarbonate backbone, a polyester carbonate or a combination thereof. In other embodiments, the acrylic dispersion comprises an acrylic backbone, a hydroxyl-containing acrylic backbone, or a combination thereof. In yet other embodiments, the polymeric dispersion is a urethane-acrylic hybrid, or polycarbonate urethane/acrylic hybrid. In some embodiments, the polymers are described as having a polycarbonate or carbonate backbone. In such embodiments, the polymer comprises aliphatic or aromatic carbonate moieties, such as bisphenol A carbonate moieties.

Various processes have been developed for the preparation of waterborne or aqueous polymeric dispersions. In the preparation of aqueous polyurethane polymers, typically a medium molecular weight polymer (e.g. prepolymer) is formed by the reaction of suitable diols or polyols with a molar excess of diisocyantes or polyisocyanates in the presence of an internal emulsifier. The internal emulsifier is typically a diol with an ionic group (carboxylate, sulfonates, or quaternary ammonium slat) or a non-ionic group, such as polyethylene oxide. Aqueous polyurethane dispersion are typically one of three types, i.e. non-ionic, cationic, and anionic depending on the type of hydrophilic segments present in the polyurethane backbone. In the case of anionic polyurethanes, dimethyol propionic acid (DMPA) is commonly incorporated into the polyurethane backbone due to its effectiveness for water dispersions in the subsequent neutralization reactions with triethylamine. The carboxylate ion of DMPA in the polymer is hydrophilic and serves an anionic center as well an internal emulsifier. Carboxylic ions not only stabilize aqueous polyurethane dispersions, but also provide curing sites. Aqueous acrylic polymers are also typically prepared with an internal emulsifier and thus typically also comprise carboxylate ions to stabilize the dispersion and provide curing sites.

The (e.g. polyurethane and/or acrylic) polymer is generally dispersed in a liquid diluent to form a polymeric dispersion. "Liquid diluent" refers to solvent that is volatile and removed after the coating is applied. In favored embodiments, the coating composition comprises predominantly water as the diluent with little or no organic solvents. In this embodiment, the concentration of organic solvent is typically less than 2, 1.5, 1 wt-% or 0.5 wt-% of the coating composition. A polyurethane dispersion available from Incorez, under the trade designation "W835 Series" are described as being co-solvent free grades of polyurethane dispersions.

The (e.g. polyurethane and/or acrylic) polymer dispersed in an aqueous diluent are film-forming polymers. Suitable polymer latexes and methods for making them are widely known in the art, and many are commercially available.

Typically, the particles in the polymer latexes are substantially spherical in shape. The polymer core may comprise one or more water-insoluble polymers, although this is not a requirement. Useful polymer particle sizes include those typical of latexes and other dispersions or emulsions. Typical polymer particle sizes are in a range of from about 0.01 micrometers to 100 micrometers, preferably in a range of from 0.01 to 0.2 micrometers, although this is not a requirement.

Examples of commercially available aqueous aliphatic polyurethane emulsions include NEOREZ R-960, NEOREZ R-967, NEOREZ R-9036, and NEOREZ R-9699 from DSM NeoResins, Inc. of Wilmington, MA; aqueous anionic polyurethane dispersions available as ESSENTIAL CC4520, ESSENTIAL CC4560, ESSENTIAL R4100, and ESSENTIAL R4188 from Essential Industries, Inc. of Merton, Wis.; polyester polyurethane dispersions available as SANCURE 843, SANCURE 898, and SANCURE 12929 from Lubrizol, Inc. of Cleveland, Ohio; an aqueous aliphatic self-crosslinking polyurethane dispersion available as TURBOSET 2025 from Lubrizol, Inc.; polyurethane dispersions available as "INCOREZ" from Incorez Co., Lancashire, England; and polyurethanes dispersions available from Stahl USA, Peabody, Mass. under the trade designations "RU-077" and "RU-075".

Self cross-linking polymer dispersion maybe used in the ink receptive layer. Such polymeric dispersions have self cross-linking function that is activated upon drying of the coating layer. The use of this type of dispersions may eliminate the need for incorporating crosslinking compounds into the coating composition. Examples of self cross-linking polymer dispersions include polyurethane dispersions available from Bayer Material Science, LLC of Pittsburgh, Pa. as "BAYHYDROL PR240" and from DSM Neoresins as "NEOREZ R-661".

Examples of commercially available aqueous aliphatic acrylic emulsions include acrylic latexes available from Dow Coating Materials under the trade designations ROSHIELD™ and RHOPLEX™ such as "ROSHIELD™ 3188", "ROSHIELD™ 3275", "ROSHIELD™ 1024", "ROSHIELD™ 636", "RHOPLEX™ WL-96", and "RHOPLEX™ CL-104"; acrylic latexes available from Arkema Coating Resins under the trade designation "UCAR™", such as "UCAR™ LATEX 455", " UCAR™ LATEX 443", "UCAR™ LATEX 451", and "UCAR™ LATEX DM109"; acrylic latexes available from Lubrizol Advanced Materials, Inc. under the trade designation HYCAR®, such as "HYCAR® 26349"; "HYCAR® 26459"; and acrylic latexes available from DSM NeoResins under the trade designation "NEOCRYL", such as "NEOCRYL A-640", "NEOCRYL XK-220", "NEOCRYL A-1044", "NEOCRYL XK-90", "NEOCRLYL XK-96" and "NEOCRYL XK-95".

Dispersions of polyurethane polymers can be characterized by measuring the properties of a 50-100 micron thin film of the neat polyurethane formed from the dispersion (dried at 22° C/50% RH for 14 days). In some embodiments, the elongation of the thin film thus formed typically has an elongation at break ranging from about 500% to about 600%. In some embodiments, the tensile strength ranges from about 15 to 30 MPa.

In some embodiments, the acrylic dispersion comprises a polyacrylate backbone, a polycarbonate backbone, or a combination thereof.

A combination of polymeric polymers may be utilized in the (e.g. anti-fog) coating composition. For example, the polyurethane dispersion may comprise two or more polyurethane polymers having a different average molecular weight. Further, the composition may contain a different type of polymer in combination with a polyurethane, for example, as would be obtained by mixing an acrylic latex and a polyurethane latex. In one embodiment, the aqueous polyurethane dispersion comprises a mixture of "INCOREZ W835/140" and "NEOREZ R-961". The inclusion of "NEOREZ R-961" can improve the abrasion resistance. However, when the concentration of "NEOREZ R-961" exceeds a a weight ratio of about 1:2 (i.e. more than 1 part by weight "NEOREZ R-961" per 2 parts by weight "INCOREZ W835/ 140"), the coating can become white after being soaked in water. In yet another example, a combination of a polyurethane polymer and an acrylic polymer is utilized or a hybrid polymer of both acrylic and polyurethane. An example of a commercially available acrylic urethane copolymer dispersion is available under the trade designation NEOPAC from DSM Neoresins.

The coating composition typically comprises one or more (e.g. polyurethane and/or acrylic) polymers in an amount totaling at least 40 wt-% solids of the coating composition and typically no greater than 90 wt-% or 85 wt-% or 80 wt-%. In some embodiments, the coating composition comprises one or more polymers in an amount of at least 45 wt-% or 50 wt-%.

The anti-fog coating comprises a hydrophilic additive that is non-reactive with respect to the polyurethane polymer, yet is reactive and thus can be crosslinked by the (e.g. aziridine) crosslinker. The concentration of such hydrophilic additive is typically at least 5 wt-%, 6 wt-%, 7 wt-%, 8 wt-%, 9 wt-% or 10 wt-% of the solids of the coating composition. In some embodiments, the concentration of hydrophilic additive is at least 11 wt-%, 12 wt-%, 13 wt-%, 14 wt-%, or 15 wt-%. The concentration of such hydrophilic additive is typically no greater than about 40 wt-% or 35 wt-%.

One example of a hydrophilic additive that can be crosslinked by the crosslinker is an acid or salt of a polyalkylene oxide. Such additive generally comprises a polyalkylene oxide backbone that comprises repeat units of the ethylene oxide, propylene oxide, or a combination thereof. The number of ethylene oxide and propylene oxide repeat units may independently range from 0 to 100 with the proviso that the sum of ethylene oxide and propylene oxide repeat units range from about 10 to 100. The polyalkylene oxide backbone typically comprises more ethylene oxide repeat units than propylene oxide repeat units. In some embodiments, the ratio of ethylene oxide repeat units to propylene oxide repeat units is at least 2:1, or 3:1; or 4:1, or 5:1, or 6: 1 or 7:1, or 8:1, or 9:1, or 10:1. The polyalkylene oxide backbone is typically linear and divalent, terminating with an acid or salt group on each end. A divalent linking group is typically present between the polyalkylene oxide backbone and the at least one or two terminal acid or salt groups. Depending on the starting compound and reactant(s), the linking group can vary. In some embodiment, the additive is formed from a polyalkylene oxide amine (also referred to as a polyether amine) reacted with a succinic anhydride forming a diacid that is then reacted with an alkyl amine to convert the acid group to an ammonium salt group. In this embodiment, the linking group between the polyalkylene oxide backbone and the terminal acid or salt groups may be —$CH_2NHCOC_2H_4$—. However, other linking group would be present by use of other reaction schemes. The molecular weight of the linking group is generally relatively small so as not to detract from the hydrophilic nature of the polyalkylene oxide backbone. In some embodiments, the molecular weight of the linking group is no greater than 100 g/mole. As the molecular weight of the polyalkylene oxide backbone increases, the molecular weight of the linking group may also increase without detracting from the hydrophilic properties. However, the molecular weight of the linking group is typically no greater than about 20, 15 or 10% by weight of the total molecular weight of the hydrophilic additive (i.e. the molecular weight of the linking groups divided by the total molecular weight multiplied by 100%).

In one embodiment, the hydrophilic additive comprises a divalent polyalkylene oxide backbone and terminal acid or salts groups, as may be represented by the following formula:

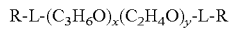

wherein is R is a reactive group that is capable of (covalently) reacting with the (e.g. aziridine) crosslinker such as a carboxylic acid group or salt thereof, L is a divalent linking, and x and y independently range from 0 to 100 with the proviso that the sum of x+y ranges from about 5, 6, 7, 8, 9, or 10 to about 100.

The linking group L can vary depending on the selection of reactants. For example, when a polyalkylene oxide diol is reacted with an isocyanate compound, L may be —OCONH—.

In another embodiment, when a polyalkylene oxide diamine is reacted with an isocyanate compound, L may be —NHCONH—. In yet another embodiment, when a polyalkylene oxide diol is reacted with an anhydride or carboxylic acid compound, L may be —(C=O)—O—. L may also be an ester linkage when a polyalkylene oxide diacid is reacted with an alcohol compound. In yet another embodiment, L may be —CONH— by reaction of a polyalkylene oxide diacid or acrylic chloride with a primary or secondary amine. The amide linkage can also be made by the reaction of a polyalkylene diamine with an anhydride or a carboxylic acid compound. In yet another embodiment, L may be —NR— by reaction of a polyalkylene oxide diamine with a halide compound or by reaction of a polyalkylene oxide dihalide with an amine compound. In yet another embodiment, L can be —COS— by the reaction of a polyalkylene oxide diol with an acryl chloride thiol or thiol ester compound. Further, L may be —CS$_2$— by reaction a polyalkylene oxide dithiol with a thiol or mercapto compound. In yet another embodiment, L may be —S— by reaction of a polyalkylene oxide dithiol with a halide compound. In yet another embodiment, L may be —O— by a condensation reaction of polyalkylene oxide diol. In yet another embodiment, L may be —SCONH— by the reaction of a polyalkylene oxide dithiol with an isocyanate compound or by reaction of a polyalkylene oxide diisocyanate with a thiol compound.

The counter ions of the acid salts can be ammonium, as well as primary, secondary or tertiary alkyl ammoniums. The counter ions may also be inorganic metallic ions including divalent zinc from zinc halides, nitrate, carbonate, or ammonium carbonate. Other inorganic metallic ions comprise Cu, Ti, and Zr.

Without intending to be bound by theory it is surmised that alkylene oxide repeat units of the acid or salt of polyalkylene oxide can aid in preventing a surfactant, compatible with such hydrophilic segments (e.g. such as a non-ionic surfactant comprising alkylene oxide repeat units) from leaching out of the coating.

The anti-fog coatings described herein comprise a crosslinker. The crosslinker typically reacts with the (e.g. carboxylate) hydrophilic segments present in the polymer (e.g. polyurethane and/or acrylic) backbone. Suitable crosslinkers typically comprises at least three terminal (e.g. carboxylate) reactive groups.

Carboxylic ion (e.g. carboxylate) containing aqueous polymeric dispersions and a multi-aziridine curing agent may be formulated as a curing polymeric dispersion. The curing mechanism can take place at ambient temperature during the drying process of when the pH value drops below 6. In some embodiments the crosslinker may also react with the (e.g. diacid or salt of a polyalkylene oxide) hydrophilic additive, as just described.

Favored examples of crosslinkers include aziridine crosslinkers available under various trade designations, such as described in the examples; carbodiamide crosslinkers, such as those available from Nisshinbo Industries, Inc. Japan under the trade designation "V-04"; and pH responsive carbonate crosslinkers, such as an ammonium zirconyl carbonate crosslinker available from Zirconium Chemicals, Flemington, NJ under the trade designation "Bacote 20".

Other crosslinkers include cycloaliphatic epoxy crosslinkers, such as available from Dow Chemicals under the trade designation "ERL-4221"; hydrophilic aliphatic polyisocyanate crosslinkers, such as available from Bayer Materials Science, Leverkusen under the trade designation "BH-305"; and melamine crosslinkers such as those available Stahl USA under the trade designation XR-9174 and from CYTEC Surface Specialties, Inc., under the trade designation "CYMEL 327".

Mixtures of crosslinkers can also be utilized, particularly mixtures with (e.g. hydrophilic) aziridine crosslinkers.

The concentration of crosslinker is typically at least 2, 3, 4, or 5 wt-% solids of the coating composition. In some embodiments, a relatively high concentration of crosslinker is utilized. For example, the concentration of crosslinker is typically at least 10 or 15 wt-% of the solids of the coating composition. The concentration of crosslinker is typically no greater than 25 wt-%, or 24 wt-%, or 23 wt-%, or 22 wt-%, or 21 wt-% or 20 wt-%.

Various multifunctional aziridine crosslinkers are known such as trimethylolpropane tri-[beta-(N-aziridinyl)-propionate, 2,2-bishydroxymethyl butanotris[3-(1-aziridine) propionate], aziridine-2-methylol acrylate, aziridine-2-methylol methacrylate, N-(2-aziridinyl)methylacrylamide, N-(2-aziridinyl)methylmethacrylamide, 1-(aziridin-2-yl)-2-oxabut-3-ene, 4-(aziridin-2-yl)-but-l-ene, and 5-(aziridin-2-yl)-pent-1-ene. These particular aziridine crosslinkers are relatively hydrophobic crosslinkers.

Particularly for embodiments wherein the crosslinker is present at relatively high concentrations, it can be favored to utilize a hydrophilic aziridine crosslinker, rather than a hydrophobic crosslinker. One favored class of hydrophilic aziridine crosslinkers comprise alkylene oxide repeat units, such as ethylene oxide repeat units. The number of alkylene oxide (e.g. ethylene oxide) repeats units is typically at least 2 or 3 and typically no greater than about 20. In some embodiments, the number of alkylene oxide (e.g. ethylene oxide) repeat units averages about 6, 7, 8, or 9. The use of a hydrophilic crosslinker is favored for embodiment wherein the composition is substantially free of or comprises a low concentration (no greater than 5 wt-%) of hydrophilic additives.

An aziridine crosslinker comprising ethylene oxide repeat units can be prepare by reacting an ethoxylated alkyl multi (meth)acrylate, such as ethoxylated (9) trimethyl propane triacrylate with an alkyl aziridine, such as 2-methylaziridine. Such aziridine crosslinker has the general formula:

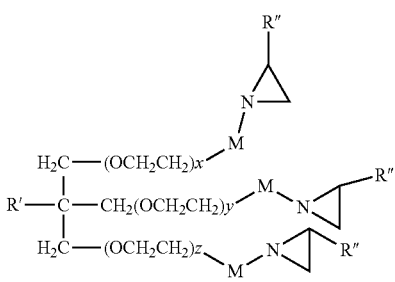

wherein R' is hydrogen, or a $C_1$-$C_4$ alkyl group;
R" is hydrogen or methyl,
x, y, and z are independently at least 1; and
M is a divalent atom of divalent linking group.

In some embodiments, the sum of x+y+z is at least 3, 4, 5, or 6. Further the sum of x+y+z may be no greater than 20. In some embodiments, M is oxygen.

Other aziridine crosslinkers comprising alkylene oxide repeat units are described in U.S. Pat. No. 8,017,666; incorporated herein by reference.

Without intending to be bound by theory it is surmised that alkylene oxide repeat units of the crosslinker aid in preventing a surfactant, compatible with such hydrophilic segments (e.g. such as a non-ionic surfactant comprising alkylene oxide repeat units) from leaching out of the coating.

The (e.g. anti-fog) coating compositions described herein may optionally comprise at least one surfactant. The term "surfactant" as used herein describes molecules that reduce the surface tension of the coating composition and provide a coating that imparts "good" or "excellent" anti-fog properties to substrates or articles coated therewith, according to the test method described in the examples. Surfactant molecules generally include both hydrophilic (polar) and hydrophobic (non-polar) segments on the same molecule.

Useful surfactants of the present invention include ionic (e.g. anionic, cationic) non-ionic, as well as amphoteric surfactants. A surfactant can be classified by the presence of formally charged groups in its head. The head of an ionic surfactant carries a net charge. An anionic surfactant has a negatively charged hydrophilic group, such as in the case of alkyl sulphates and alkyl ethoxylated sulfates. Cationic surfactants have a positively charged hydrophilic group, such as in the case of sodium salts and quaternary (e.g. ammonium) salts. A non-ionic surfactant has no charged groups in its head. Some illustrative surfactants are described in WO 2009/085680; incorporated herein by reference.

For embodiments that comprise a surfactant, the surfactant concentration in the coating compositions is typically at least 0.5 wt-%, 1 wt-%, 1.5 wt-%, or 2 wt-% percent of the coating composition. The surfactant concentration is typically no greater than 10 wt-% of the coating composition.

In some embodiments, the (e.g. anti-fog) coating composition comprises a non-ionic surfactant. Non-ionic surfactants generally comprise an alkyl or alkenyl group having at least 6, or 8, or 10, or 12 carbon atoms. Such relatively long chain alkyl or alkylene group is commonly referred to as a "fatty" group. The number of carbon atoms can be greater than 18 carbon atoms provided the non-ionic surfactant is a liquid at ambient temperature (e.g. 25° C.). In some embodiments, the alkyl or alkenyl group has no greater than 24 carbon atoms. In some favored embodiments, such alkyl group is unbranched. The alkyl or alkenyl group may optionally comprise substituents.

Various classes of non-ionic surfactants are known including for example fatty alcohols, fatty acids, fatty amines, fatty amides, and derivatives thereof.

Fatty alcohols typically have the general formula:

wherein R is a (e.g. straight or branched chain) alkyl or alkenyl group, as previously described, optionally substituted in available positions by N, O, or S atoms. Various fatty alcohols are known including dodecyl alcohol, cetyl alcohol $CH_3(CH_2)_{15}OH$, stearyl alcohol (also known as octadecyl alcohol or 1-octadecanol), and oleyl alcohol.

In some embodiments, the non-ionic surfactant is a derivative of a fatty alcohol. One favored derivative is a fatty alcohol, ester or derivative thereof comprising alkylene oxide repeat units such as ethylene oxide and/or propylene oxide repeat units. Such derivatives may also be referred to as a polyethoxylated and/or polypropoxylated fatty alcohols, esters, or derivatives thereof. Polyethoxylated fatty alcohols have the general formula:

wherein R is a (e.g. straight or branched chain) alkyl or alkenyl group, as previously described, optionally substituted in available positions by N, O, or S atoms. The number of ethylene oxide repeat units, "n" can range from 2 to 20. In some embodiments, n is at least 3 or 4 and no greater than about 10 or 12.

Surfactant comprising polyalkylene oxide repeat units, such as polyethoxylated fatty alcohols, can be a favored non-ionic surfactant of the coating composition.

In some embodiments, one or more polyethoxylated fatty alcohols are the sole surfactant of the coating composition. In other embodiments, at least one polyethoxylated fatty alcohol is employed in combination with a second surfactant. The polyethoxylated fatty alcohol surfactant may be utilized in combination with a second surfactant at a weight ratio of about 1:1 or 2:1. In some embodiments, the second surfactant is a silicone surfactant, an ionic surfactant, or mixture thereof.

The some embodiments, the coating composition comprises an ionic surfactant or silicone surfactant.

Silicone surfactants generally comprises a siloxane backbone with a various number of dimethyl siloxane units, typically end-capped with a trimethyl siloxane group at each end. The siloxane backbone is generally the hydrophobic group. The hydrophilic group can be ionic, zwitterionic, or non-ionic and are usually attached by a short alkyl chain to the siloxane backbone. One illustrative siloxane surfactant is a polyether modified siloxane, commercially available from Innovadex under the trade designation "BYK-346".

Various ionic surfactants are known. One illustrative ionic surfactant is a sodium alpha olefin sulfonate, commercially available from Stepan Company under the trade designation "A-18". Another ionic surfactant is a polyoxyethylene alkylphenyl ether ammonium sulfate, commercially available from Dai-Ichi Kogyo Seiyaku., Ltd. of Japan under the trade designation "Hitenol BC 10".

Various non-ionic surfactants as previously described comprise a hydroxyl group. Anti-fog coatings have been previously described wherein a hydroxyl functional surfactant is utilized as a reactant during the formation of the polyurethane. (See for example U.S. Pat. No. 3,822,238) However, in the presently described anti-fog coating compositions a preformed (e.g. commercially available) polymer, provided as an aqueous dispersion is utilized as a component. The polymer of the dispersion is typically free of hydroxyl-reactive groups. Hence, when a hydroxyl functional surfactant is combined with such polyurethane dispersion, the surfactant does not react with the polyurethane due. In other words the surfactant is non-reactive with respect to the (e.g. polyurethane and/or acrylic) polymer.

The anti-fog coating described herein may optionally comprise various hydrophilic additives. A hydrophilic additive is distinguished from a surfactant in that a hydrophilic additive lacks a hydrophobic group, a requisite group of a surfactant. In some embodiments, the coating compositions comprise a small concentration of a (e.g. non-reactive) hydrophilic additive, such as a polyethylene glycol (PEG) monomethyl ether, to enhance the anti-fog performance. In this embodiment, the concentration of the hydrophilic additive is typically at least 0.5 wt-%, or 1 wt-%, or 1.5 wt-%, or 2 wt-% and generally no greater than about 5 wt-%.

In some embodiments, an acid or salt of a polyalkylene oxide is the primary or sole hydrophilic component of the coating composition.

In another embodiment, an acid or salt of a polyalkylene oxide and one or more surfactants is the primary or sole hydrophilic components of the coating composition.

In another embodiment, an acid or salt of a polyalkylene oxide and a hydrophilic aziridine crosslinker are the primary or sole hydrophilic components of the coating composition.

In another embodiment, the coating composition comprises an acid or salt of a polyalkylene oxide, one or more surfactants, and a hydrophilic aziridine crosslinker as the primary or sole hydrophilic components of the coating composition.

In each of these embodiments, the coating composition may comprise less than 5 wt-% or no other hydrophilic organic monomers, oligomer or polymers such as monomer or polymers derived from N-vinylpyrrolidone.

In some embodiments, the anti-fog coating compositions are free of inorganic nanoparticles. Such dried and cured composition typically exhibits satisfactory abrasion resistance due to the selection of polyurethane and the relatively high concentration of crosslinker.

In other embodiments, the coating composition comprises inorganic nanoparticles at a concentration of at least 0.5 wt-%, 1 wt-%, or 2 wt-% and typically no greater than about 40 wt-% of the solids of the coating composition. In some embodiments, the concentration of inorganic nanoparticles is no greater than about 30 wt-% or 20 wt-%. In some embodiments, the linear abrasion is compromised, particularly with 200 or 300 cycles when the nanoparticle concentration is 15 wt-% or greater.

"Nanoparticles" are herein defined as nanometer-sized particles, preferably with an average particle size of no greater than 100, 75 or 50 nanometers (nm). In some embodiments, the average particle size of the inorganic nanoparticles is no greater than 40, or 30, or 20 nm (prior to surface modification. The average particle size of the nanoparticles is at least 1 nm, 2 nm, or 3 nm.

As used herein, "particle size" and "particle diameter" have the same meaning and are used to refer to the largest dimension of a particle (or agglomerate thereof). In this context, "agglomeration" refers to a weak association between particles which may be held together by charge or polarity and can be broken down into smaller entities.

Average particle size of the nanoparticles can be measured using transmission electron microscopy. In the practice of the present invention, particle size may be determined using any suitable technique. Particle size refers to the number average particle size and is measured using an instrument that uses transmission electron microscopy or scanning electron microscopy. Another method to measure particle size is dynamic light scattering that measures weight average particle size. One example of such an instrument found to be suitable is the N4 PLUS SUB-MICRON PARTICLE ANALYZER available from Beckman Coulter Inc. of Fullerton, Calif.

The nanoparticles may be relatively uniform in size. Uniformly sized nanoparticles generally provide more reproducible results. Preferably, variability in the size of the nanoparticles is less than 25% of the mean particle size.

The nanoparticles preferably have a surface area of at least 10 m$^2$/gram, more preferably at least 20 m$^2$/gram, and even more preferably at least 25 m$^2$/gram. The nanoparticles preferably have a surface area of greater than 750 m$^2$/gram.

Nanoparticles of the present invention can be porous or nonporous. In some embodiments, the nanoparticles consist solely of only silica. Silica can be preferred nanoparticles, particularly silica nanoparticles derived from a silicate, such as an alkali metal silicate or ammonium silicate. Herein, "silica nanoparticles" refer to nanoparticles that include only silica as well as to core-shell nanoparticles with a surface that includes silica. In other embodiments, the coating composition may comprise other inorganic oxides such as $ZrO_2$, colloidal zirconia, $Al_2O_3$, colloidal alumina, $CeO_2$, colloidal ceria, $SnO_2$, colloidal tin (stannic) oxide, and $TiO_2$, colloidal titanium dioxide). Mixtures of such inorganic oxides can also be utilized.

The unmodified nanoparticles are typically provided as a dispersion rather than as a powder. Preferred dispersion generally contain from 15 wt-% to 50 wt-% of colloidal particles dispersed in a fluid medium. Representative examples of suitable fluid media for the colloidal particles include water, aqueous alcohol solutions, lower aliphatic alcohols, ethylene glycol, N,N-dimethylacetamide, formamide, or combinations thereof. The preferred fluid medium is aqueous, e.g., water and optionally one or more alcohols. Inorganic silica sols in aqueous media are well known in the art and available commercially. Silica sols in water or water-alcohol solutions are available commercially under such trade names as LUDOX (manufactured by E.I. duPont de Nemours and Co., Inc., Wilmington, Del.), NYACOL (available from Nyacol Co., Ashland, Mass.) or NALCO (manufactured by Nalco Chemical Co., Naperville, Ill.). Useful silica dispersions include "NALCO 1115" and "DVSZN004", both available from Nalco Chemical Company.

The inorganic nanoparticles typically comprise a surface treatment. Surface-treating the nano-sized particles can provide a stable dispersion in the polymeric resin. Preferably, the surface-treatment stabilizes the nanoparticles so that the particles will be well dispersed in the aqueous polyurethane dispersion and results in a substantially homogeneous composition. Furthermore, the nanoparticles can be modified over at least a portion of its surface with a surface treatment agent so that the stabilized particle can copolymerize or react with the polyurethane or aziridine crosslinker during curing.

In general a surface treatment agent has a first end that will attach to the particle surface (covalently, ionically or through strong physisorption) and a second end that imparts compatibility of the particle with the remainder of the coating composition and/or reacts with components of the coating composition during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers.

In some embodiments the nanoparticles comprise a surface treatment comprising a water dispersible group. Water-dispersible groups are monovalent groups that are capable of providing hydrophilic characteristics to the nanoparticle surface, thereby reducing, and preferably preventing, excessive agglomeration and precipitation of the nanoparticles in an aqueous coating solution. Such surface treatment can be represented by the formula A-L-WD, wherein A are the surface-bonding groups (i.e. for bonding to the nanoparticle surface), WD represents the water-dispersible groups, and L represents an organic linker or a bond. Organic linkers L can be linear or branched alkylene, arylene, or a combination of alkylene and arylene groups, optionally including heteroatoms.

The water-dispersible groups are hydrophilic or water-like groups. They typically include, for example, nonionic groups, anionic groups, cationic groups, groups that are capable of forming an anionic group or cationic group when dispersed in water (e.g., salts or acids), or mixtures thereof.

Examples of nonionic water-dispersible groups include polyalkylene oxide (e.g. PEG) groups. One illustrative silane surface treatment for use with silica nanoparticles is a polyethylene oxide (PEG) silane, such as 2-[methoxy (polyethyleneoxy)propyl]trimethoxysilane. The surface treatment may comprise other water dispersible groups, as well as epoxy silane surface treatments, such as described in WO2009/085680; incorporated herein by reference.

The required amount of surface modifier can depend on several factors such particle size, particle type, modifier molecular weight, and modifier type. In general it is preferred that approximately a monolayer of modifier is attached to the surface of the particle. The attachment procedure or reaction conditions required also depend on the surface modifier used. For silanes it can be preferred to surface treat at elevated temperatures under acidic or basic conditions for approximately 1-24 hours.

The level of coverage of the inorganic nanoparticles herein is reported in terms of the concentration of epoxy groups in the coating composition, assuming 100% of the amount of functional groups of the surface treatment would be covalently bonded to surface of the silica particles. In some embodiments, the inorganic nanoparticles comprise a surface treatment at 25% or 50% coverage.

Coating compositions can be supplied in liquid form (e.g., in a pourable form or sprayable form) or impregnated into an applicator substrate (e.g., forming an applicator pad or wipe). Suitable applicator substrates can be in the form of a sponge, foam, woven, nonwoven, or knit material, for example. The term "nonwoven web" or "nonwoven fabric" refers to a web or fabric having a structure of individual fibers that are interlaid in an irregular manner. In contrast, knit or woven fabrics have fibers that are interlaid in a regular manner.

The liquid polyurethane coating compositions can be applied by conventional methods, including spraying, spin coating, brushing, dipping, flow coating, etc., but typically are applied by spin coating or spraying. The coating operation can be conducted either in a single stage or by a multiple stage coating procedure, as is well known in the art. The conditions adopted for curing the (e.g. aziridine) cross-linkers with the polyurethane polymer can vary. In some embodiments, the coating is thermally cured at a temperature from about 90 to 120° C. for about 20 minutes. Generally, lower temperatures require longer cure times. Infrared heating can be used to shorten the time until the coating can be handled.

The dried and cured coating compositions described herein can exhibit high transparency, greater than 90% and thus are suitable for application to a variety of light transmissive substrates and articles. The haze of the dried and cured coating is typically less than 5, 4, 3, 2, 1 or 0.5%. The highly transparent compositions are typically substantially free of opacifiying pigments (i.e. less than 0.5 or 0.1 wt-%)

The coating compositions can provide anti-fog properties to substrates coated and dried and cured thereon. Dried and cured coatings are considered to have "good" or "excellent" anti-fogging properties if a coated substrate resists the formation of small, condensed water droplets in sufficient density to significantly reduce the transparency of the coated substrate such that it cannot be adequately seen through, according to the test method described in the example.

In some embodiments, the dried and cured coating compositions are sufficiently durable that such that good or excellent anti-fog characteristics are provided initially and after being soaked in 50° C. water for 24 hours. In other embodiments, the dried and cured coating compositions are sufficiently durable that they can provide good or excellent anti-fog characteristics after being soaked in 65° C. water for 120 hours.

In some embodiments, the dried and cured coating compositions exhibited mechanical durability (i.e., the haze of the coatings increased only 1-7% haze change) after linear razor abrasion test and no scratches were observed after wiping the coatings with a paper towel for 100, 200, or 300 cycles.

There are various articles that can benefit from an anti-fog coating such as traffic signs, motor vehicle windows and particularly windshields, protective eyewear (e.g. goggles, face shields, helmets, etc.) and architectural glazings, as well as other decorative glass articles.

Substrates to which the antifog coating composition can be applied are preferably transparent or translucent to visible light. If the coating composition is utilized for a different purpose, the substrate may alternatively be opaque such as in the case of stainless steel, polyvinyl chloride, and fiberboard. Substrates include both organic and inorganic materials. Exemplary substrates are made of polyester (e.g., polyethylene terephthalate (PET), polybutyleneterephthalate), polycarbonate (PC), allyldiglycolcarbonate, polyacrylates such as polymethylmethacrylate, polystyrene, polysulfone, polyethersulfone, cellulose acetate butyrate, glass, and the like, including blends and laminates thereof. Typically the substrate is in the form of a film, sheet, panel or pane of material and is part of an article. The substrate may be flat, curved or shaped. The article to be coated may be produced by blowing, casting, extrusion, or injection molding.

The anti-fog coatings may be coated on both sides of the substrate. Alternatively, the coatings of the present invention may be coated on one side of the substrate. The opposite side of the substrate may be uncoated or coated with a wide variety of conventional antifogging compositions. Preferably, the coating surface should face the direction of higher humidity, e.g., on a face shield the side having the anti-fog coating should face the wearer.

The inclusion of the coating described herein can reduce the contact angle of a coated (e.g. substrate) surface. The advancing contact angle with water may be reduced by 20%, 30%, 40%, 50%, 60%, 70% or 80% as compared to the same substrate lacking such coating. For example, the contact angle of fiberboard can be reduced from 50°+ to less than 25° or 20°. As another example, the advancing contact angle with water of stainless steel can be reduced from 85°+ to less than 50°, or 40°, or 20°. As yet another example, the advancing contact angle with water of polyvinylchloride can be reduced from 60°+ to less than 30°, or 25°, or 20°. Thus, the presence of the coating described herein can reduce the advancing contact angle with water of a variety of substrates to less than 30°, or 25°, or 20°. Further, the receding contact angle with water (e.g. of fiberboard, stainless steel, and polyvinylchloride) can be reduced to 5° or less.

Objects and advantages of this disclosure are further illustrated by the following examples, but the particular materials and amounts thereof recited in these examples, as well as other conditions and details, should not be construed to unduly limit this disclosure.

Test Descriptions

Test for Anti-Fogging Property

The anti-fogging property of the coatings according to the invention was determined by placing coated substrates over a container of hot water (at a temperature of about 50-60° C.). If fogging was observed within 10 seconds, the coating was deemed to have "poor" anti-fogging property. If fogging was observed within 10-60 seconds, the coating was deemed to have "good" anti-fogging property. If fogging was observed after 60 seconds, the coating was deemed to have "excellent" anti-fogging property.

Test for Measuring Transmission & Haze

Transmission and haze values disclosed herein were measured using a Haze-Gard Plus haze meter (available from BYK-Gardiner, Silver Springs, MD) according to the procedure described in ASTM D1003.

Test for Durability of Coatings

The adhesion of the anti-fog coatings and the (plastic) substrates was determined by cross-hatch/tape adhesion test. All of the coatings made according to the Examples of this invention passed the cross-hatch/tape adhesion test.

Mechanical durability of the anti-fog coatings was determined by subjecting the coated substrates to linear abrasion test. The linear abrasion test was carried out by wiping the coatings with a paper towel for 100, 200 or 300 cycles under a constant force of about 1400 grams of force (13.73 N). Then the coatings were tested for haze and observed visually for the presence of scratches.

Materials

The following list of materials and their source is referred to throughout the examples.

| Material | Description |
| --- | --- |
| NALCO 1115 | An aqueous (4 nm) colloidal silica dispersion obtained from Nalco Co., Naperville, IL under trade designation "NALCO 1115". |
| DVSZN004 | An aqueous (42 nm) colloidal silica dispersion obtained from Nalco Co., Naperville, IL. |
| W835/140 | Polyurethane dispersion having polycarbonate backbone, obtained from Incorez Co., Lancashire, England under trade designation "INCOREZ W835/140". |
| EM 2382 | Ethoxylated (9) trimethylpropane triacrylate, obtained from Eternal Chemical Co., |
| SR 502 | Ethoxylated (9) trimethylpropane triacrylate, obtained from Sartomer Company, Exton, PA under trade designation "SR 502". |
| 2-methylaziridine | Obtained from Sigma Aldrich Chemical Company, St. Louis, MO. |
| 2-[Methoxy(polyethyleneoxy)propyl] trimethoxysilane | Obtained from Gelest, Inc., Morrisville, PA. |
| ED-900 | Polyetheramine, obtained from The Woodlands, TX under trade designation "JEFFAMINE ED-900". |
| ED-2003 | Polyetheramine, obtained from The Woodlands, TX under trade designation "JEFFAMINE ED-2033". |
| Poly(ethylene glycol) (200) monomethacrylate | Obtained from Sigma Aldrich Chemical Company, St. Louis, MO. |
| PZ-28 | Propylene imine tri-functional aziridine, obtained from PolyAziridine, LLC, Medford, NJ under trade designation "PZ-28". |
| PZ-33 | Propylene imine tri-functional aziridine, obtained from PolyAziridine, LLC, Medford, NJ under trade designation "PZ-33". |
| XL-706 | VOC free, tri-functional aziridine crosslinker, obtained from Picassian Polymers, under trade designation "XL-706". |
| CX-100 | Multi-functional aziridine crosslinker, obtained from Royal DSM N.V., Harleen, Netherlands under trade designation "CX-100". |
| Succinic anhydride | Obtained from Alfa Aesar, Ward Hill, MA. |
| Bacote 20 | Ammonium Zirconyl Carbonate, cross-linking agent, available from Zirconium Chemicals, Flemington, NJ |
| ERL-4221 | Cycloaliphatic epoxy, cross-linking agent, available from Dow Chemicals, Midland, MI |

| Material | Description |
| --- | --- |
| V-04 | Carbodiamide, cross-linking agent, available from Nisshinbo Industries, Inc. Japan. |
| BH-305 | Hydrophilic aliphatic polyisocyanate, cross-linking agent, available from Bayer Materials Science, Leverkusen, Germany |
| Triethylamine | Obtained from Sigma Aldrich Chemical Company, St. Louis, MO. |
| THF | Tetrahydrofuran, obtained from Sigma Aldrich Chemical Company, St. Louis, MO. |
| AL-2450 | Alumina nanoparticle dispersion (50 wt %) obtained from Nanophase Technologies, Corp., Romeoville, IL, under trade designation "NANO ARC AL-2450" |
| BRIJ 30 | Tetraethylene glycol dodecyl ether, obtained from Sigma Aldrich Chemical Company, St. Louis, MO under trade designation "BRIJ 30". |
| BYK-346 | Silicone surfactant, available from Innovadex under trade designation "BYK-346". |
| A-18 | Ionic Surfactant, obtained from Stepan Company, Northfield, IL under trade designation "POLYSTEP A-18" |
| BC-10 | Ionic Surfactant, available from Dai-Ichi Kogyo Seitaku, Ltd. of Japan under trade designation "Hitenol BC-10" |
| PEG monomethyl ether | Poly(ethylene glycol) methyl ether (Mw = 550) is obtained from Sigma Aldrich Chemical Company, St. Louis, MO. |

EXAMPLES

Synthesis of Nanoparticles Comprising PEG Silane Surface Treatment:

For each of Preparative Examples 1-3, silica nanoparticles modified with functional silanes were prepared by slowly adding a desired amount of a functional silane to selected silica nanoparticle dispersion. The relative amounts of the silica nanoparticle dispersion to the functional silane were determined on the basis of equivalent surface coverage desired. The resulting dispersions were stirred for 4hours at room temperature and then heated up to 65° C. in an oven overnight. Table 1 below describes the silica nanoparticles, functional silanes used and the percent coverage obtained for each of Preparative Examples 1-3. The resulting modified nanoparticle dispersions with different particle size and surface coverage were used as described in Examples described below.

TABLE 1

| Nanoparticles | % Surface Coverage | Functional silane |
| --- | --- | --- |
| DVSZN004 | 50 | 2-[Methoxy(polyethyleneoxy)propyl]trimethoxysilane |

Preparative Example 4

Synthesis of Multi-Functional Aziridine Crosslinker:

Trifunctional aziridine crosslinkers, PZ-2382 and PZ-502, were prepared via a Michael addition of EM 2382 (MW=692) or SR-502 (MW=692) with 2-methylaziridine. Briefly, the 2-methylaziridine (9.1 grams, 0.1385 mol) was added drop-wise to the EM 2382 or SR-502 (30 grams, 0.0434 mol) at room temperature, then the resulting mixture was stirred for 1 hour at room temperature and then refluxed at 60° C. for 24 hours. Excessive methyl aziridine was removed under vacuum and finally a slight yellow liquid product was obtained and named PZ-2382 and PZ-502, respectively. The disappearance of the double bonds from 5.8 to 6.4 confirms that the reaction between acrylate group and NH in the methyl aziridine was completed successfully.

The NMR spectra of the "EM-2382" trifunctional acrylate was obtained using a modern 500 MHz Avance III Bruker NMR obtained from Bruker BioSpin Corporation, Tucson, Ariz. According to analysis this acrylate contained 30 wt-% of the following surfactant:

HO—[CH$_2$CH$_2$O]n-C$_{12}$H$_{25}$

Hence, the aziridine crosslinker prepared from "EM-2382" was calculated to contain 23 wt-% of such surfactant.

Preparative Example 5

Synthesis of PEG-Based Ammonium Salts (900-DA and 2003-DA):

To the succinic anhydride (10 grams) dissolved into THF at 50° C., the ED-900 (50 grams) or ED-2003 (100 grams) was added. After 24 hours of reaction at 50° C., the product yellow viscous liquid or yellowish wax, respectively, was obtained after removal of THF under vacuum. The resulting PEG-based diacid was dissolved into water to obtain a 30% aqueous solution, to which 10 grams of triethylamine was added and stirred at room temperature for 30 minutes to obtain PEG-based dicarboxylic acid ammonium salts with 30 wt % solid. The resulting product was used in the salt form in the Examples that follow. The reaction scheme is shown below.

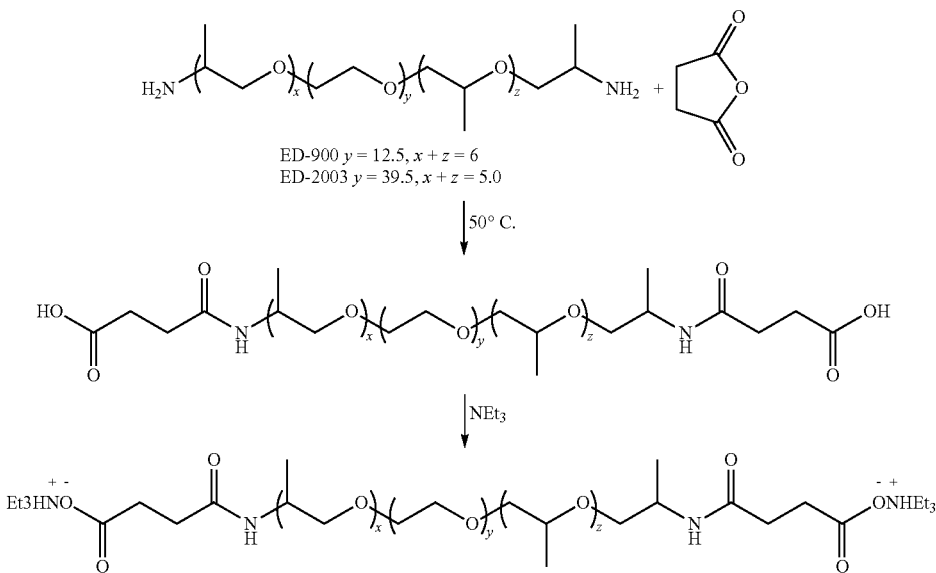

ED-900 y = 12.5, x + z = 6
ED-2003 y = 39.5, x + z = 5.0

General Process for Forming Anti-fog Coatings

The components were mixed together and stirred for 20 minutes at room temperature. The resulting coating solutions with a solid content of about 30-35% were coated on polyester (PET), polycarbonate (PC) or glass substrates using a #15 Mayer bar or by dip coating. The resulting coatings were then cured at a temperature from 110-120° C. for 20-30 minutes, to form coatings with the desired properties (i.e., clear and durable anti-fog coatings).

Dip Coating Procedure

Place clip with freshly prepared polycarbonate lens slide on metal bar of Velmax Unislide dip coater. Align slide so sides are perpendicular to lab bench top and bottom is parallel to lab bench top. Secure binder clips with tape. The substrates were immersed in coating solutions and were gradually pulled out at an appropriate pulling speed of about 1 mm/second.

Example 1

The polyurethane dispersion W835/140 (32 wt %, 60.9 grams) was mixed with 15 grams of 900-DA (30 wt %, prepared as described above in Preparative Example 5) under stirring to form a homogenous dispersion, then 6.0 grams of PZ-2382 (neat, prepared as described above in Preparative Example 4) and 18.1 grams of water were added and stirred for 20 min until a homogenous dispersion was obtained. The solution (30 wt % solids) was applied on a PC plate by a Velmax Unislide dip coater and then cured at 110° C. for 20 minutes. The resulting coated PC film exhibited "excellent" anti-fog performance (no fog appeared when exposed to 50° C. vapor) and good light transmittance (>90). After soaking in room temperature water for 240 hours as well as 96 hours at 80° C. water or 120 hours at 65° C., the coated PC plates still exhibit "excellent" anti-fog performance and very durable.

Example 2

The polyurethane dispersion W835/140 (32 wt %, 60.2 grams) was mixed with 29.2 grams of 900-DA (30 wt %, prepared as described above in Preparative Example 5) under stirring to form a homogenous dispersion, then 7.0 grams of PZ-2382 (neat) and 3.6 grams of water were added and stirred for 20 min until a homogenous dispersion was obtained. The solution (35 wt % solids) was applied on a PC plate by a Velmax Unislide dip coater and then cured at 110° C. for 20 minutes. The resulting coated PC film exhibited "excellent" anti-fog performance (no fog appeared when exposed to 50° C. vapor) and good light transmittance (>90). After soaking in room temperature water for 240 hours as well as 96 hours at 80° C. water or 120 hours at 65° C., the coated PET film still exhibit "excellent" anti-fog performance and very durable.

Example 3

The polyurethane dispersion W835/140 (32 wt %, 54.7 grams) was mixed with 35 grams of 900-DA (30 wt %, prepared as described above in Preparative Example 5) under stirring to form a homogenous dispersion, then 7.0 grams of PZ-2382 (neat) and 3 grams of water were added and stirred for 20 min until a homogenous dispersion was obtained. The solution (35 wt % solids) was applied on a PC plate by a Velmax Unislide dip coater and then cured at 110° C. for 20 minutes. The resulting coated PC film exhibited "excellent" anti-fog performance (no fog appeared when exposed to 50° C. vapor) and good light transmittance (>90). After soaking in room temperature water for 240 hours as well as 96 hours at 80° C. water or 120 hours at 65° C., the coated PC plate still exhibit "excellent" anti-fog performance and very durable.

Example 4

The polyurethane dispersion W835/140 (32 wt %, 65.6 grams) was mixed with 23.3 grams of 900-DA (30 wt %, prepared as described above in Preparative Example 5) under stirring to form a homogenous dispersion, then 7.0 grams of PZ-2382 (neat), 1 gram BYK-346 and 3 grams of water were added and stirred for 20 min until a homogenous dispersion was obtained. The solution (35 wt % solids) was applied on a PC plate by a Velmax Unislide dip coater and then cured at 110° C. for 20 minutes. The resulting coated PC film exhibited "excellent" anti-fog performance (no fog appeared when exposed to 50° C. vapor) and good light transmittance (>90). After soaking in room temperature water for 240 hours as well as 96 hours at 80° C. water or 120 hours at 65° C., the coated PC film still exhibit "excellent" anti-fog performance and very durable. A glass plate and a PC lens were coated with the above coating solution by casting and dip coating methods followed by curing at 110° C. for 20 minutes. The resulting coated glass plate and PC lens had "excellent" anti-fog performance before and after 24 hours of soaking in room temperature water as well as hot water.

Example 5

The polyurethane dispersion W835/140 (32 wt %, 54.7 grams) was mixed with 35.0 grams of 900-DA (30 wt %, prepared as described above in Preparative Example 5) under stirring to form a homogenous dispersion, then 7.0 grams of PZ-2382 (neat), 1 gram BYK-346 and 4 grams of water were added and stirred for 20 min until a homogenous dispersion was obtained. The solution (35 wt % solids) was applied on a PC plate with a # 14 Mayer Bar and then cured at 110° C. for 20 minutes. The resulting coated PC film exhibited "excellent" anti-fog performance (no fog appeared when exposed to 50° C. vapor) and good light transmittance (>90). After soaking in room temperature water for 240 hours as well as 96 hours at 80° C. water or 120 hours at 65° C., the coated PC film still exhibit "excellent" anti-fog performance and very durable. A glass plate and a PC lens were coated with the above coating solution by casting and dip coating methods followed by curing at 110° C. for 20 minutes. The resulting coated glass plate and PC lens had "excellent" anti-fog performance before and after 24 hours of soaking in room temperature water as well as hot water.

Example 6

The polyurethane dispersion W835/140 (32 wt %, 56.3 grams) was mixed with 15.0 grams of 900-DA (30 wt %, prepared as described above in Preparative Example 5) under stirring to form a homogenous dispersion, then 6.0 grams of PZ-2382 (neat), 5.0 grams PEG-modified DVSZN004 (Preparative Example 2, 50% coverage and 30 wt %) and 17.7 grams of water were added and stirred for 20 min until a homogenous dispersion was obtained. The solution (30 wt % solids) was applied on a PC plate by a Velmax Unislide dip coater and then cured at 110° C. for 20 minutes. The resulting coated PC film exhibited "excellent" anti-fog performance (no fog appeared when exposed to 50° C. vapor) and good light transmittance (>90). After soaking in room temperature water for 240 hours as well as 96 hours at 80° C. water or 120 hours at 65° C., the coated PC film still exhibit "excellent" anti-fog performance and very durable. A PC lens was coated with the above coating solution by dip coating followed by curing at 110° C. for 20 minutes. The resulting coated PC lens had "excellent" anti-fog performance before and after 24 hours of soaking in room temperature water as well as hot water.

Example 7

The polyurethane dispersion W835/140 (32 wt %, 60.9 grams) was mixed with 15 grams of 2003-DA (30 wt %, prepared as described above in Preparative Example 5) under stirring to form a homogenous dispersion, then 6.0 grams of PZ-2382 (neat) and 18.1 grams of water were added and stirred for 20 min until a homogenous dispersion was obtained. The solution (30 wt % solids) was applied on a PC plate by a Velmax Unislide dip coater and then cured at 110° C. for 20 minutes. The resulting coated PC film exhibited "excellent" anti-fog performance (no fog appeared when exposed to 50° C. vapor) and good light transmittance (>90). After soaking in room temperature water for 240 hours as well as 96 hours at 80° C. water or 120 hours at 65° C., the coated PC plates still exhibit "excellent" anti-fog performance and very durable.

Example 8

The polyurethane dispersion W835/140 (32 wt %, 60.9 grams) was mixed with 25 grams of 900-DA (30 wt %, prepared as described above in Preparative Example 5) under stirring to form a homogenous dispersion, then 3.0 grams of PZ-28 (neat) and 11.1 grams of water were added and stirred for 20 min until a homogenous dispersion was obtained. The solution (30 wt % solids) was applied on a PC film with a # 14 Mayer Bar and then cured at 110° C. for 20 minutes. The resulting coated PC film exhibited "excellent" anti-fog performance (no fog appeared when exposed to 50° C. vapor) and good light transmittance (>90). After soaking in room temperature water for 240 hours as well as 96 hours at 80° C. water or 120 hours at 65° C., the coated PC film still exhibit "excellent" anti-fog performance and very durable.

Example 9

The polyurethane dispersion W835/140 (32 wt %, 60.9 grams) was mixed with 25 grams of 900-DA (30 wt %, prepared as described above in Preparative Example 5) under stirring to form a homogenous dispersion, then 3.0 grams of PZ-33 (neat) and 11.1 grams of water were added and stirred for 20 min until a homogenous dispersion was obtained. The solution (30 wt % solids) was applied on a PC plate with a # 14 Mayer Bar and then cured at 110° C. for 20 minutes. The resulting coated PC film exhibited "excellent" anti-fog performance (no fog appeared when exposed to 50° C. vapor) and good light transmittance (>90). After soaking in room temperature water for 240 hours as well as 96 hours at 80° C. water or 120 hours at 65° C., the coated PC film still exhibit "excellent" anti-fog performance and very durable.

Example 10

The polyurethane dispersion W835/140 (32 wt %, 60.9 grams) was mixed with 25 grams of 900-DA (30 wt %, prepared as described above in Preparative Example 5) under stirring to form a homogenous dispersion, then 3.0 grams of XL-706 (neat) and 11.1 grams of water were added and stirred for 20 min until a homogenous dispersion was obtained. The solution (30 wt % solids) was applied on a PC film with a # 14 Mayer Bar and then cured at 110° C. for 20 minutes. The resulting coated PC film exhibited "excellent" anti-fog performance (no fog appeared when exposed to 50° C. vapor) and good light transmittance (>90). After soaking in room temperature water for 240 hours as well as 96 hours at 80° C. water or 120 hours at 65° C., the coated PC film still exhibit "excellent" anti-fog performance and very durable.

Example 11

The polyurethane dispersion W835/140 (32 wt %, 60.9 grams) was mixed with 25 grams of 900-DA (30 wt %, prepared as described above in Preparative Example 5) under stirring to form a homogenous dispersion, then 3.0 grams of CX-100 (neat) and 11.1 grams of water were added and stirred for 20 min until a homogenous dispersion was obtained. The solution (30 wt % solids) was applied on a PC film with a # 14 Mayer Bar and then cured at 110° C. for 20 minutes. The resulting coated PC film exhibited "excellent" anti-fog performance (no fog appeared when exposed to 50° C. vapor) and good light transmittance (>90). After soaking in room temperature water for 240 hours as well as 96 hours at 80° C. water or 120 hours at 65° C., the coated PC film still exhibit "excellent" anti-fog performance and very durable.

Example 12

The polyurethane dispersion W835/140 (32 wt %, 54.7 grams) was mixed with 35.0 grams of 900-DA (30 wt %, prepared as described above in Preparative Example 5) under stirring to form a homogenous dispersion, then 7.0 grams of PZ-502 (neat), 1 gram BRIJ 30 and 4 grams of water were added and stirred for 20 min until a homogenous dispersion was obtained. The solution (35 wt % solids) was applied on a PC plate with a # 14 Mayer Bar or by dipping coating and then cured at 110° C. for 20 minutes. The resulting coated PC film exhibited "excellent" anti-fog performance (no fog appeared when exposed to 50° C. vapor) and good light transmittance (>90). After soaking in room temperature water for 240 hours as well as 96 hours at 80° C. water or 120 hours at 65° C., the coated PC film still exhibit "excellent" anti-fog performance and very durable. A glass plate and a PC lens were coated with the above coating solution by casting and dip coating methods followed by curing at 110° C. for 20 minutes. The resulting coated glass plate and PC lens had "excellent" anti-fog performance before and after 24 hours of soaking in room temperature water as well as hot water.

Example 13

The polyurethane dispersion W835/140 (32 wt %, 65.6 grams) was mixed with 23.3 grams of 900-DA (30 wt %, prepared as described above in Preparative Example 5) under stirring to form a homogenous dispersion, then 7.0 grams of PZ-502 (neat), 1 gram BRIJ 30 and 3 grams of water were added and stirred for 20 min until a homogenous dispersion was obtained. The solution (35 wt % solids) was applied on a PC plate with a # 14 Mayer Bar or by dipping coating and then cured at 110° C. for 20 minutes. The resulting coated PC film exhibited "excellent" anti-fog performance (no fog appeared when exposed to 50° C. vapor) and good light transmittance (>90). After soaking in room temperature water for 240 hours as well as 96 hours at 80° C. water or 120 hours at 65° C., the coated PC film still exhibit "excellent" anti-fog performance and very durable. A glass plate and a PC lens were coated with the above coating solution by casting and dip coating methods followed by curing at 110° C. for 20 minutes. The resulting coated glass plate and PC lens had "excellent" anti-fog performance before and after 24 hours of soaking in room temperature water as well as hot water.

Table 3 below summarizes the components and the relative amounts of each component in the resulting cured coatings on substrates of Examples 1-13 described above.

TABLE 3

| Example | Wt % Polyurethane (W835/140) | Type and Wt % Diacid Salt | | Type and Wt % Aziridine PZ-2382* | BYK-346 | BRIJ 30 |
|---|---|---|---|---|---|---|
| | | 900-DA | 2003-DA | | | |
| 1 | 65 | 15 | | 20 | | |
| 2 | 55 | 25 | | 20 | | |
| 3 | 50 | 30 | | 20 | | |
| 4 | 58.3 | 19.4 | | 19.4 | 2.8 | |
| 5 | 48.6 | 29.1 | | 19.4 | 2.7 | |
| 6** | 60 | 15 | | 20 | | |
| 7 | 65 | | 15 | 20 | | |
| 8 | 65 | 25 | | 10 PZ-28 | | |
| 9 | 65 | 25 | | 10 PZ-33 | | |
| 10 | 65 | 25 | | 10 XL-706 | | |
| 11 | 65 | 25 | | 10 CX-100 | | |
| 12 | 48.6 | 29.1 | | 19.4 PZ-502 | | 2.7 |
| 13 | 58.3 | 19.4 | | 19.4 PZ-502 | 2.7 | |

PZ-2382 comprises 23% surfactant, as previously described.
Therefore, 15 wt-% PZ-2382 = 3.5 wt-% of surfactant and 11.5 wt-% hydrophilic aziridine crosslinker
25 wt-% PZ-2382 = 5.8 wt-% of surfactant and 19.2 wt-% hydrophilic aziridine crosslinker
24.2 wt-% PZ-2382 = 5.6 wt-% of surfactant and 18.6 wt-% hydrophilic aziridine crosslinker
23 wt-% PZ-2382 = 5.3 wt-% of surfactant and 17.7 wt-% hydrophilic aziridine crosslinker
**Example 6 also contained 5 wt-% of the silica nanoparticles comprising a PEG silane surface treatment, as previously described.

All the anti-fog coatings prepared from compositions of Table 3 exhibited excellent mechanical durability (i.e., the haze of the coatings increased only 1-7% haze change after linear razor abrasion test and no scratches were observed after wiping the coatings with a paper towel for 300 cycles).

Example 14

An acrylic latex (40.5 wt %, 43.5 grams), available from Dow Coating Materials under the trade designation "ROSHIELD™ 3188", was mixed with 900-DA prepared as described in the Example 22 (30 wt %, 30 grams) under stirring to form a homogenous dispersion. Then PZ-2382 (7.0 grams, neat) and 19.5 grams of water were added respectively and the resulting solution was stirred for 20 min. The final dispersion solution (35 wt % solids) was thus obtained and subsequently applied on a PC film with a # 14 Mayer. The resulting coating was cured at 110° C. for 20 minutes. The resulting coated PC film exhibited "excellent" anti-fog performance (no fog appeared when exposed to 50° C. vapor after 1 minute) and good optical properties with light transmittance up to 90%. Samples were subjected to both water soak tests, one at room temperature for 120 hours, and one at 65° C. 120 hours. The soaked PC samples showed excellent water resistance and anti-fog properties remained.

Example 15

A polyurethane/acrylic hybrid latex (40 wt %, 43.5 grams), available from DSM NeoResins Company under the trade designation "NEOPAC R-9036" was mixed with 900-DA prepared as described in Example 22 (30 wt %, 30.0 grams) under stirring to form a homogenous dispersion. Then PZ-2382 (7.0 grams, neat), and 19.5 grams of water were added respectively and the resulting solution was stirred for 20 min until a homogenous dispersion was obtained. The final dispersion solution (35 wt % solids) was thus obtained and subsequently was applied on a PC film with a # 14 Mayer. The resulting coating was cured at 110° C. for 20 minutes. The resulting coated PC film exhibited "excellent" anti-fog performance (no fog appeared when exposed to 50° C. vapor after 1 minute) and good optical properties with light transmittance up to 90%. Samples were subjected to both water soak tests, one at room temperature for 120 hours, and one at 65° C. 120 hours. The soaked PC samples showed excellent water resistance and anti-fog properties remained.

Examples 16-20

A polyurethane dispersion blend was formed by combining the polyurethane dispersion W835/140 (32 wt %, 94.38 grams) with 900-DA prepared as described in Example 22 (30 wt %, 61.17 grams). The mixture was stirred for 15 minutes to form a homogenous dispersion. To it was added 1.75 grams of BYK-346 with stirring. The mixture was stirred for 15 additional minutes to make a homogenous dispersion.

The crosslinker (type and amount shown in the table below) was combined with 0.4 grams of water, and 9 grams of the polyurethane blend to make the anti-fog coating composition.

Examples 16-20 were coated onto PC film as described earlier using Meyer bar #15. The coatings were cured at 120° C. for 20 minutes.

| Example | Cross-linker (1) Type | Cross-linker (1) amount | Cross-linker (2) Type | Cross-linker (2) amount |
|---|---|---|---|---|
| Example 16 | PZ-2382 | 0.77 grams | Bacote 20 | 0.1 grams |
| Example 17 | Bacote 20 | 0.3 grams | none | |
| Example 18 | PZ-2382 | 0.7 grams | ERL 4221 | 0.1 grams |
| Example 19 | PZ-2382 | 0.7 grams | BH-305 | 0.1 grams |
| Example 20 | V-04 | 0.8 grams | none | |

Anti-fog properties were evaluated after soaking in 50° C. water for 24 hours. Examples 16-20 exhibited good anti-fog properties and excellent light transmission.

Example 21

The polyurethane dispersion W835/140 (32 wt %, 32.8 grams) was mixed with 11.5 grams of 900-DA (30 wt %) under stirring to form a homogenous dispersion, then 3.0 grams of PZ-502 (neat), 0.75 g Jeecol LA-7 ($C_{12}EO_7$ from Jeen International Co.) and 1.0g BYK-346 were added and stirred for 20 minutes until a homogenous dispersion was obtained. The solution was casted on the substrates, such as stainless steel, PVC, and fiberboard then cured at room temperature.

Example 22

The polyurethane dispersion W835/140 (32 wt %, 32.8 grams) was mixed with 11.5 grams of 900-DA (30 wt %) under stirring to form a homogenous dispersion, then 1.0 grams of Bacote 20 (20% by weight in water), 0.75 g Jeecol LA-7 ($C_{12}EO_7$ from Jeen International Co.) and 1.0g BYK-346 were added and stirred for 20 minutes until a homogenous dispersion was obtained. The solution was casted on the substrates, such as stainless steel, PVC, and fiberboard then cured at room temperature.

Contact angle measurements with water were obtained from the resulting coated and uncoated substrates using a VCA Optima goniometer (AST products, INC). The results are reported in the following table.

| Contact Angle Analysis (Degrees) | | | | |
|---|---|---|---|---|
| Sample | Advancing | St. Dev. | Receding | St. Dev. |
| Fiberboard Control | 54.3 | 11.7 | 20.4 | 3.0 |
| Fiberboard w/ Example 21 Coating | 16.8 | 1.5 | <3 | |
| Fiberboard w/ Example 22 Coating | 15.6 | 0.9 | <3 | |
| Stainless Steel Control | 89.4 | 2.7 | 35.5 | 2.4 |
| Stainless Steel w/ Example 21 Coating | 19.6 | 0.3 | <3 | |
| Stainless Steel w/ Example 22 Coating | 16.1 | 1.1 | <3 | |
| PVC Control | 68.3 | 8.9 | 25.6 | 2.0 |
| PVC w/Example 21 Coating | 19.0 | 0.4 | <3 | |
| PVC w/Example 22 Coating | 16.7 | 0.1 | <3 | |

What is claimed is:

1. A coating composition comprising
    an aqueous polymeric dispersion;
    a crosslinker comprising an aziridine crosslinker; and
    a polyalkylene oxide backbone terminating with an acid or salt group on each end, wherein the polyalkylene oxide backbone comprises a copolymer of polyethylene oxide and polypropylene oxide, and wherein the polyalkylene oxide backbone is linked to the acid or salt group on each end by a divalent linking group, the divalent linking group selected from:
    —CH$_2$NHCOC$_2$H$_4$—, —NHCONH—, —(C=O)—O—, —CONH—, —COS—, —CS$_2$—, —S—, —O—, and —SCONH—.

2. The coating composition of claim 1
    wherein the aqueous polymeric dispersion comprises a carboxylate-containing polymer selected from a polyurethane polymer, an acrylic polymer, or a mixture thereof, and wherein the carboxylate-containing polymer is present in the dried and cured coating composition in an amount of at least about 40 wt %.

3. The coating composition of claim 2 wherein the polymer comprises carbonate moieties.

4. The coating composition of claim 1 wherein the polyalkylene oxide comprises 10 to 100 repeat units selected from ethylene oxide and propylene oxide.

5. The coating composition of claim 4 wherein the ratio of ethylene oxide repeat units to propylene oxide repeat units is at least 2:1.

6. The coating composition of claim 1 wherein the crosslinker further comprises a pH sensitive carbonate crosslinker, a carbodiimide crosslinker, or a mixture thereof.

7. The coating composition of claim 1 wherein the aziridine crosslinker comprises alkylene oxide repeat units.

8. The coating composition of claim 1 wherein the coating composition comprises at least 10 wt % solids of aziridine crosslinker.

9. The coating composition of claim 1 wherein the coating composition further comprises a surfactant.

10. The coating composition of claim 9 wherein the surfactant is a nonionic surfactant.

11. The coating composition of claim 10 wherein the surfactant comprises polyalkylene oxide repeat units.

12. The coating composition of claim 9 wherein the coating composition comprises a silicone surfactant, an ionic surfactant, or a mixture thereof.

13. The coating composition of claim 1 wherein the dried and cured coating comprises inorganic oxide nanoparticles.

14. The coating composition of claim 13 wherein the inorganic oxide nanoparticles comprise silica nanoparticles.

15. The coating composition of claim 14 wherein the nanoparticles comprise a silane surface treatment comprising a water dispersible group.

16. The coating composition of claim 1 wherein the dried and cured coating composition does not exhibit fogging within 60 seconds after being soaked in 50° C. water for 24 hours.

17. The coating composition of claim 1 wherein the dried and cured coating composition does not exhibit fogging within 60 seconds after being soaked in 50° C. water for 24 hours or 65° C. water for 120 hours.

18. The coating composition of claim 1 wherein the cured coating has a light transmission of at least 90%.

19. An article comprising a substrate and the dried and cured coating of claim 1.

20. The article of claim 19 wherein the substrate is light transmissive or opaque.

21. The article of claim 20 wherein the substrate is stainless steel, fiberboard, or polyvinylchloride.

22. A method of providing an anti-fog coating on a surface of a substrate, the method comprising
    providing the coating composition according to claim 1;
    applying the coating composition to a substrate; and
    drying and curing the coating composition.

* * * * *

UNITED STATES PATENT AND TRADEMARK OFFICE
CERTIFICATE OF CORRECTION

PATENT NO. : 10,048,408 B2
APPLICATION NO. : 14/361076
DATED : August 14, 2018
INVENTOR(S) : Yongshang Lu Page 1 of 1

It is certified that error appears in the above-identified patent and that said Letters Patent is hereby corrected as shown below:

In the Specification

Column 5,
Line 33, delete "RHOPLEX™" and insert -- RHOPLEX™, --, therefor.

Column 8,
Line 43, delete "-but-l-ene," and insert -- -but-1-ene, --, therefor.

Column 25,
Line 50, delete "($C_{12}EO_7$" and insert -- ($C_{12}EO_7$ --, therefor.
Line 63, delete "($C_{12}EO_7$" and insert -- ($C_{12}EO_7$ --, therefor.

In the Claims

Column 26,
Line 42, in Claim 2, delete "wt %" and insert -- wt-% --, therefor.
Line 57, in Claim 8, delete "wt %" and insert -- wt-% --, therefor.

Signed and Sealed this
Ninth Day of October, 2018

Andrei Iancu
*Director of the United States Patent and Trademark Office*